United States Patent [19]

Hopkins et al.

[11] 4,174,762

[45] Nov. 20, 1979

[54] HYDROSTATIC TRANSMISSION WITH DIFFERENTIAL STEERING

[75] Inventors: Donald L. Hopkins, Joliet; Gordon W. Johnson, Dunlap, both of Ill.

[73] Assignee: Caterpillar Tractor Co., Peoria, Ill.

[21] Appl. No.: 893,202

[22] Filed: Apr. 3, 1978

Related U.S. Application Data

[63] Continuation of Ser. No. 764,946, Feb. 2, 1977, abandoned.

[51] Int. Cl.$^2$ .................................................. B62D 11/06
[52] U.S. Cl. ........................................ 180/6.44; 60/433
[58] Field of Search ................. 180/6.44, 6.7; 60/433; 74/720.5

[56] References Cited

U.S. PATENT DOCUMENTS

| | | | |
|---|---|---|---|
| 2,560,554 | 7/1951 | Colby | 74/674 |
| 3,349,860 | 10/1967 | Ross | 180/6.44 |
| 3,477,225 | 11/1969 | Cryder | 60/433 |
| 3,655,004 | 4/1972 | Hoashi | 180/6.48 |
| 3,672,167 | 6/1972 | Griesenbrock | 60/465 |
| 3,782,488 | 1/1974 | Williamson | 180/6.48 |

*Primary Examiner*—Joseph F. Peters, Jr.
*Assistant Examiner*—R. Schrecengost
*Attorney, Agent, or Firm*—Phillips, Moore, Weissenberger, Lempio & Majestic

[57] ABSTRACT

A vehicle includes a variable displacement fluid pump and a variable displacement hydrostatic motor for driving the tracks of the vehicle. An auxiliary reversible motor may be actuated in one and the other directions to provide steering of the vehicle through planetary drives associated with the tracks of the vehicle.

8 Claims, 1 Drawing Figure

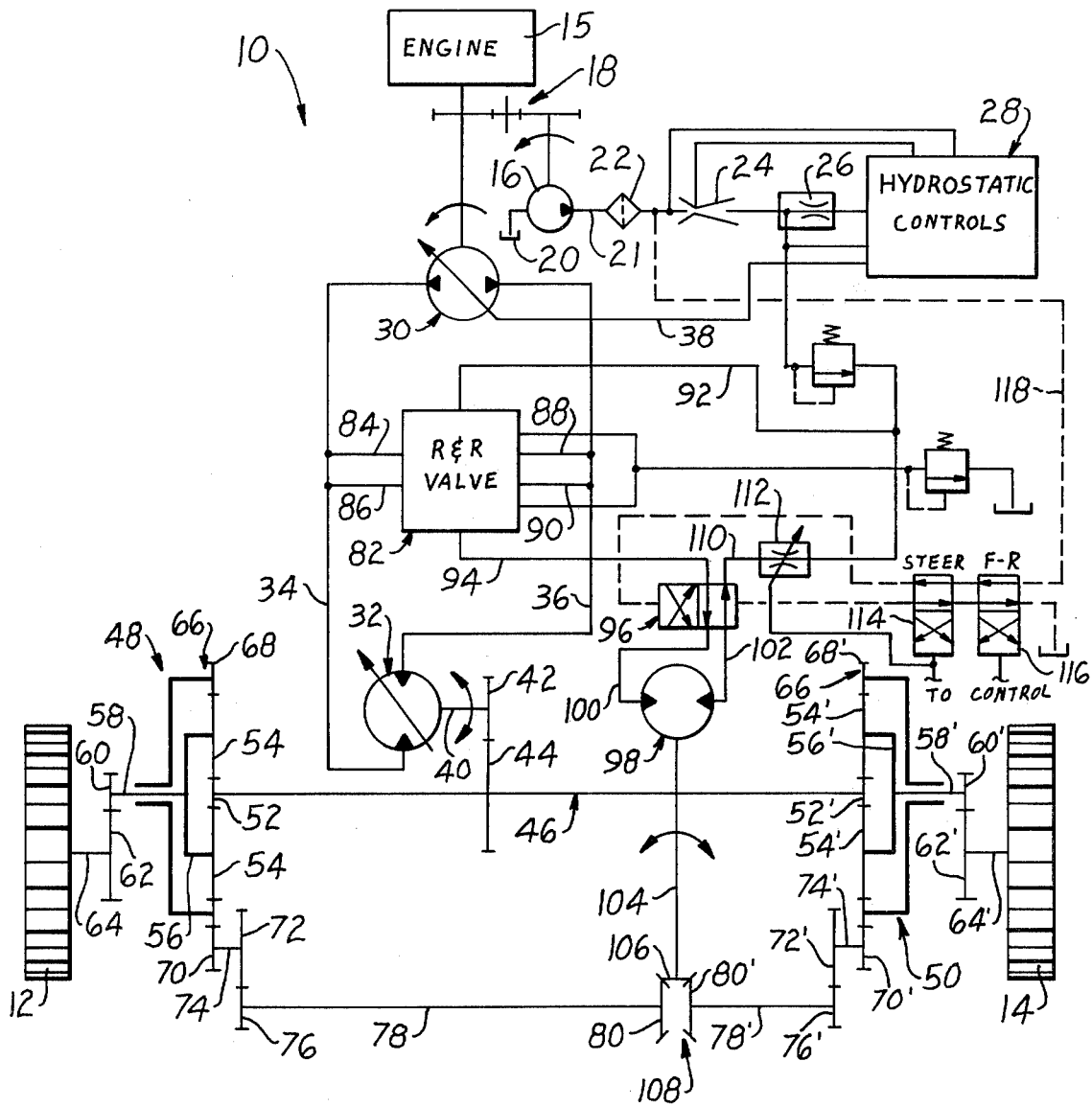

HYDROSTATIC TRANSMISSION WITH DIFFERENTIAL STEERING

This is a continuation, of Ser. No. 764,946, filed Feb. 2, 1977 and now abandoned.

BACKGROUND OF THE INVENTION

This invention relates to drive for vehicles, and more particularly to a fluid drive system for providing steering of a track-type vehicle.

In the use of a track-type vehicle, it is of course important that effective driving of the vehicle in a straight direction take place. Furthermore, it will be understood that effective steering of the vehicle, in either the forward or reverse direction of vehicle drive, must be accomplished. Generally, it is well known to provide two separate hydrostatic motor units for driving the wheels or tracks on the respective sides of the vehicle. Such a system is disclosed in U.S. Pat. No. 3,655,004. It will be understood that it would be advantageous to provide a system wherein a single pump can be used to provide proper driving and actuation for steering of wheels or tracks of a vehicle.

U.S. Pat. No. 2,560,554 discloses a drive system wherein shafts can be locked relatively together to drive a vehicle through planetary drive systems. Such shafts can also be made to rotate in opposite directions to provide a steering effect. It is to be seen in such patent that a relatively complicated electrical and mechanical system is used for providing such steering effect of the vehicle.

U.S. Pat. No. 3,672,167 discloses a hydrostatic transmission and a motor which is used to drive a differential for driving a pair of wheels. However, there is no steering system disclosed therein.

U.S. Pat. No. 3,782,488 discloses a pair of hydrostatic transmissions with a single control for controlling the displacement of a pair of pumps to achieve a steering effect. Thus, similar to U.S. Pat. No. 3,655,004, a pair of pumps are used in the operation of the system.

SUMMARY OF THE INVENTION

It is accordingly an object of this invention to provide a drive and steering system for a track-type vehicle which utilizes fluid motors for providing drive and steering of the track-type vehicles.

It is a further object of this invention to provide a system which, while fulfilling the above object, is extremely simple in design and effective in use.

Broadly stated, the invention comprises a drive and steering system for a vehicle having a pair of tracks comprising a first motor, and means operatively coupling the first motor and tracks to drive the tracks of the vehicle. Further included is a second motor, the second motor being a fluid motor. Means are included for selectively providing pressurized fluid to the second motor to selectively drive the second motor. Means are included which operatively couple the second motor and at least one of the tracks for providing a relatively differential movement between the tracks different from the relative differential movement thereof provided by the first motor.

BRIEF DESCRIPTION OF THE DRAWING

These and other objects of the invention will become apparent from a study of the following specification and drawing, which is a schematic drawing of a vehicle drive and steering system in accordance with the present invention.

DESCRIPTION OF THE PREFERRED EMBODIMENT

Shown in the drawing is the overall system 10 for providing drive and steering of a track-type vehicle, the drive sprockets of which are shown at 12, 14. As shown therein, a vehicle engine 15 drives a pump 16 through a gear train 18. The pump 16 draws fluid from a reservoir 20 and pumps such fluid through a line 21 and through a filter 22 and into and from a venturi 24 to an orifice 26 and thence to the hydrostatic controls 28 of the vehicle. The engine 15 also drives a reversible variable displacement hydrostatic pump 30. The pump 30 is connected with a variable displacement hydrostatic motor 32 by conduit 34 and conduit 36. The variable displacement pump 30 is operatively coupled with the hydrostatic controls 28 by conduit means 38 as is well known, so that actuation of the hydrostatic controls 28 in a chosen manner varies the displacement of the pump 30 to in turn drive the motor 32 in a chosen manner.

The output shaft 40 of the motor drives a gear 42 which is engaged with a gear 44 in turn driving a shaft 46. The ends of the shaft 46 are operatively associated with identical planetary gear systems 48,50 to couple them with the respective sprockets 12,14 of the vehicle, and consequently only one planetary gear system 48 and its association with the end of the shaft 46 will be described in detail.

That end of the shaft 46 has fixed thereto a sum gear 52, which is in engagement with a plurality of planet gears 54 rotatably mounted to an intermediate member or carrier 56. The intermediate member 56 has fixed thereto an outwardly extending shaft 58 having a gear 60 fixed thereto. Such gear 60 is in driving engagement with a gear 62 fixed to the shaft 64 of the sprocket 12. The plurality of gears 54 is also engaged with a ring gear 66. The ring gear 66 has outwardly projecting teeth 68 which are in engagement with the teeth of a gear 70 of a pair 70,72 thereof secured together by a shaft 74. The other gear 72 of the pair is in engagement with a gear 76 secured to a shaft 78, the opposite end of which has fixed thereto a bevel gear 80.

As set forth above, the planetary gear system 50 is identical in configuration, associated with the sprocket 14.

A relief and replenishing valve 82 generally as disclosed in U.S. Pat. No. 3,477,225, is in operative association with the pump 30 and motor 32 by means of conduits 84,86,88,90. The relief and replenishing valve 82 is capable of supplying fluid from the line 21 through a line 92 to the low pressure conduit of the conduits 34,36, and also of drawing additional fluid from the low pressure conduit of the conduits 34,36 and supplying fluid from the relief and replenishing valve 82 into a conduit 94 under conditions to be further described.

The conduit 94 communicates with a 2-position valve 96 which in turn communicates with a reversible fluid motor 98 through conduits 100,102. The output drive shaft 104 of the motor 98 has a bevel gear 106 fixed thereto which is in engagement with the bevel gears 80,80', so that the bevel gears 80,80',106 form a differential 108. A conduit 110 leads from the valve 96 to a variable pressure compensated meter out flow control valve 112, which is not sensitive to vehicle loads determining pressure in the drive system, which valve 112 may be opened and shut by controls to be further described. If the valve 112 is in the open position, fluid from the relief and replenishing valve 82 will be allowed to travel through motor 98 in one and the other directions to drive the motor 98 in one and the other directions, through the flow control valve 112, and into the conduit 92 back to the relief and replenishing valve 82.

A pair of pilot valves 114,116 are included, for selectively directing fluid from the conduit 118 to the valve 96 for positioning the valve 96 in one and the other respective positions. The valve is a steering valve 114 actuated by, for example, a level in the cab of the vehicle (not shown). The valve 114 is always in one or the other positions to direct fluid to one or the other sides of the valve 96. However, it will be understood that fluid flow cannot take place through the motor 98 and valve 96 if the valve 112 is closed. The motor 98 is thereby locked for a non-steer effect. The lever may be chosen to be, for example, in a vertical position to determine a closed position of the valve 112. Moving the lever in one direction opens the valve 112 and moves the steering valve 114 to the chosen steering position, or if the steering valve 114 is already in such chosen position, causes such steering valve 114 to remain in such position. Moving the lever in the other direction from the neutral position of course moves the steering valve 114 to its other position and opens the orifice 112. Moving the lever back to its neutral position leaves the steering valve 114 in the position it has occupied, but closes the valve 112.

The valve 116 is in series with the valve 114 for providing an overall reversal of the flow of pilot fluid to the valve 96.

Under normal operation, with no steering effect chosen, the engine 15 drives the pump 30 which in turn drives the motor 32 to drive the shaft 46. The relief and replenishing valve 82 supplies fluid to the lower pressure conduit of the conduits 34,36. Fluid cannot flow from the conduit 94 through the motor 98, since the valve 112 is closed. Thus, the differential 108 is locked, i.e., the shafts 78,78' are held from rotation. Thus, the shaft 46 rotates the gears 52,52' to rotate the planetary gears 54,54'. The ring gears 66,66' are held from rotation since the shafts 78,78' are not rotating, and consequently the planetary gears 54,54' rotate within the ring gears 66,66' to drive the shafts 58,58' to in turn drive the track-driving sprockets 12,14 at the same speed. This provides straight driving of the vehicle. It will be understood that reversal of the pump 30 drives the motor in reverse 32 to drive the track-driving sprockets 12,14 in the reverse direction at equal speeds.

Assuming that the track-driving sprockets 12,14 are indeed being driven at the same speed, and also assuming that steering of the vehicle is desired, the lever described above may be actuated to open the valve 112 and to move the steering valve 114 to the proper position, if it is not already in such proper position, for steering of the vehicle as chosen. Assuming, for example, that the steering valve 114 is moved upward, pilot fluid will be supplied to the right side of the valve 96 so that the valve 96 is in its first position as shown. Fluid will then be allowed to exit from the relief and replenishing valve 82 through the conduit 94, through the valve 96, to drive the motor 98 in one direction. Such driving of the motor 98 provides a differential movement of the shafts 78,78', rotating one in one direction and one in the opposite direction, so that through the planetary gear systems 48,50, a differential movement is provided between the track-driving sprockets 12,14 of the vehicle, one such drive sprocket in fact relatively slowing down. It will be seen that steering of the vehicle is thereby provided, through differential movement of the tracks being driven by the track-driving sprockets 12,14.

It will be seen that movement of the steering valve 114 to its other position provides pilot fluid to the other side of the valve 96 to move such valve 96 to its second position to provide pressurized fluid to the motor 98 to drive the motor 98 in the other direction. Thus, the track which was relatively slowed down before will speed up to the normal drive speed, and the track which was previously at normal drive speed will slow down.

If the vehicle is being operated in the reverse direction, the forward/reverse valve 116 is actuated to provide reverse flow of pilot fluid to the valve 96. This reverses the output drive of the motor 98, which is necessary when driving in the reverse vehicle mode, to provide that the same operation of the above-described lever will provide consistent left or right steering as chosen.

The embodiments of the invention in which an exclusive property or privilege is claimed are defined as follows:

1. A drive and steering system for a vehicle having a pair of tracks comprising:
   a hydrostatic transmission having a hydrostatic fluid motor;
   means operatively coupling the hydrostatic motor and tracks, to drive the tracks of the vehicle;
   hydrostatic control means for controlling said hydrostatic fluid motor;
   another fluid motor;
   means for selectively communicating pressurized fluid to the another motor to selectively drive the another motor, wherein said communicating means (i) is provided in fluid communication with said hydrostatic fluid motor such that the fluid driving said hydrostatic fluid motor can also selectively drive said another motor and (ii) is operatively associated with said hydrostatic control means; and
   means operatively coupling the another motor and at least one of the tracks for providing a relative differential movement between the tracks different from the relative driving movement thereof provided by the hydrostatic fluid motor.

2. The apparatus of claim 1 wherein said another motor is reversible fluid motor and further comprising pilot pressure means operatively coupled to said reversible fluid motor for selectively reversing said reversible fluid motor, said pilot pressure means operatively coupled to said hydrostatic control means.

3. The apparatus of claim 1 further comprising means operatively coupling the another motor and both tracks for providing a relative driving movement between the tracks different from the relative driving movement thereof provided by the single hydrostatic fluid motor.

4. A drive and steering system for a vehicle having a pair of tracks comprising:
   a hydrostatic transmission having a hydrostatic fluid motor;
   means operatively coupling the hydrostatic motor and tracks, to drive the tracks of the vehicle;
   hydrostatic control means for controlling said hydrostatic fluid motor;
   another fluid motor;

means for selectively communicating pressurized fluid to the another motor to selectively drive the another motor;

means operatively coupling the another motor and at least one of the tracks for providing a relative differential movement between the tracks different from the relative driving movement thereof provided by the hydrostatic fluid motor; and wherein said communicating means includes a flow control valve operable associated with said hydrostatic control means, the hydrostatic control means opening said flow control valve to provide pressurized fluid to the another motor for steering the vehicle.

5. The apparatus of claim 4 wherein said flow control valve is a variable flow control valve.

6. A drive and steering system for a vehicle having a pair of tracks or the like comprising:

a first motor;

means operatively coupling the first motor and tracks to drive the tracks of the vehicle;

a second fluid motor;

means for selectively communicating pressurized fluid to the second motor to selectively drive the second motor;

means operatively coupling the second motor and at least one of the tracks for providing a relative differential movement between the tracks different from the relative driving movement thereof provided by the first motor;

wherein the second motor is a reversible fluid motor, and wherein the means for selectively communicating pressurized fluid to the second motor comprise means for selectively communicating pressurized fluid to the second motor to selectively drive the second motor in one and the other directions;

wherein the means for selectively communicating pressurized fluid to the second motor comprise valve means movable to a first position to provide pressurized fluid to the second motor to drive the second motor in one direction, and movable to a second position to provide pressurized fluid to the second motor to drive the second motor in the other direction;

further comprising a pilot pressure system operatively coupled with said valve means, and a selector valve operatively coupled with said pilot pressure system to provide shifting of the valve means to the first and second positions thereof;

wherein said selector valve includes a first pilot valve and a second pilot valve, said second pilot valve for reversing the flow of fluid in said pilot pressure system established by said first pilot valve.

7. The apparatus of claim 6 further comprising means operatively coupling the second motor and both tracks for providing a relative driving movement between the tracks different from the relative driving movement thereof provided by the first motor.

8. The apparatus of claim 6 wherein the first motor comprises a fluid motor.

* * * * *